US012798023B2

(12) United States Patent
Dippell et al.

(10) Patent No.: US 12,798,023 B2
(45) Date of Patent: Nov. 17, 2026

(54) SUBSTRATE CARRIER

(71) Applicant: SINGULUS TECHNOLOGIES AG, Kahl am Main (DE)

(72) Inventors: Torsten Dippell, Langen (DE); Simon Hübner, Seligenstadt (DE); Stefan Kempf, Alzenau (DE); Emmerich Manfred Novak, Kloster Lehnin (DE); Michael Reising, Mömbris (DE); Reiner Rohrmann, Freigericht (DE)

(73) Assignee: SINGULUS TECHNOLOGIES AG, Kahl am Main (DE)

( * ) Notice: Subject to any disclaimer, the term of this patent is extended or adjusted under 35 U.S.C. 154(b) by 354 days.

(21) Appl. No.: 18/573,324

(22) PCT Filed: Apr. 7, 2022

(86) PCT No.: PCT/EP2022/059333
§ 371 (c)(1),
(2) Date: Dec. 21, 2023

(87) PCT Pub. No.: WO2023/274598
PCT Pub. Date: Jan. 5, 2023

(65) Prior Publication Data

US 2024/0286235 A1 Aug. 29, 2024

(30) Foreign Application Priority Data

Jun. 28, 2021 (DE) ..................... 10 2021 003 326.4

(51) Int. Cl.
*B23Q 1/03* (2006.01)

(52) U.S. Cl.
CPC .................................... *B23Q 1/032* (2013.01)

(58) Field of Classification Search
None
See application file for complete search history.

(56) References Cited

U.S. PATENT DOCUMENTS

| | | | | |
|---|---|---|---|---|
| 3,951,395 | A * | 4/1976 | Hennenfent | B25B 1/2405 228/44.3 |
| 10,062,598 | B2 * | 8/2018 | Ngo | B05C 13/00 |
| 2005/0214398 | A1 | 9/2005 | Meissl et al. | |
| 2007/0241454 | A1 | 10/2007 | Chen et al. | |
| 2011/0000882 | A1 | 1/2011 | Foote et al. | |

(Continued)

FOREIGN PATENT DOCUMENTS

| | | | |
|---|---|---|---|
| CN | 206685356 | U | 11/2017 |
| DE | 102012108986 | A1 | 3/2014 |

(Continued)

OTHER PUBLICATIONS

International Search Report and Written Opinion for PCT Application No. PCT/EP2022/059333 mailed Aug. 16, 2022 (English Translation and Original).

(Continued)

*Primary Examiner* — Mahdi H Nejad
*Assistant Examiner* — John Michael Larson
(74) *Attorney, Agent, or Firm* — Branch Partners PLLC; Bruce E. Black

(57) ABSTRACT

The present invention relates to a substrate carrier for receiving and transporting several substrates.

15 Claims, 5 Drawing Sheets

(56) References Cited

U.S. PATENT DOCUMENTS

| | | | | |
|---|---|---|---|---|
| 2012/0006489 | A1 * | 1/2012 | Okita | H10P 72/3312 156/345.43 |
| 2015/0170947 | A1 | 6/2015 | Bluck et al. | |
| 2016/0276142 | A1 | 9/2016 | Lopp et al. | |
| 2016/0372321 | A1 * | 12/2016 | Krishnan | C23C 16/4584 |
| 2019/0080945 | A1 * | 3/2019 | Schober | H10P 72/18 |

FOREIGN PATENT DOCUMENTS

| | | | |
|---|---|---|---|
| DE | 102014116342 | A1 | 5/2016 |
| WO | WO2013064613 | A2 | 5/2013 |
| WO | 2013083196 | A1 | 6/2013 |
| WO | WO2016083162 | A1 | 6/2016 |

OTHER PUBLICATIONS

International Preliminary Report on Patentability for PCT Application No. PCT/EP2022/059333 mailed Dec. 14, 2023 (English Translation and Original).

* cited by examiner

SUBSTRATE CARRIER

CROSS-REFERENCE TO RELATED APPLICATIONS

This present application is a U.S. national stage application of PCT Application No. PCT/EP2022/059333, filed Apr. 7, 2022, which claims priority to German Patent Application No. 10 2021 003 326.4, filed Jun. 28, 2021, both of which are hereby incorporated by reference in their entirety.

The present invention relates to a substrate carrier for receiving and transporting several substrates.

In a number of industrial processes, substrate carriers (or so-called "carriers") for receiving and transporting several substrates are used to introduce the substrates into corresponding processing plants, carry them during substrate treatment and/or transport them between different units of such processing plants. Inter alia, such substrate carriers are utilized during the coating of substrates or wafers.

Examples of different substrate carriers may be found in US 2007/241454 A1, US 2005/214398 A1, US 2011/000882 A1, US 2012/0006489 A1 as well as CN 206685356 U.

Depending on the type of industrial process in which these substrate carriers come into use, different requirements are made to these substrate carriers. In this context, with regard to, e.g., two-sided coating processes, it is important that the substrates are stored in their "nests" in a securely centered manner with respect to the respective coating openings, with edge coverage resulting from the storage being minimized at the same time. Furthermore, it should be possible to insert and remove the substrates in a simple manner without damaging the substrates. Furthermore, different processes may lead to strong variations in temperature since the substrates are subjected to, e.g., different heating and cooling steps within the course of a coating process. In doing so, the substrate carriers may be deformed, which may lead to substrates resting in the nest in an undefined manner and, as a result, to flawed coating.

It is an object of the present invention to provide improved substrate carriers against the background of the requirements discussed above.

The present invention is directed to a substrate carrier for receiving and transporting several substrates, wherein the substrate carrier comprises one or more supporting plates. Each of the one or more supporting plates comprises several openings for receiving a respective substrate, wherein each opening comprises a circumferential inner wall and a circumferential receiving edge forming a circumferential or circumferential supporting surface for a substrate. Furthermore, each opening comprises several centering lugs, each of which forming a bevel or curved surface extending from the edge of the opening defined by the inner wall of the opening and a top surface of the supporting plate to the supporting surface.

The geometry of the substrate carrier according to the invention allows for easy and safe loading and unloading of the substrate carrier as well as minimizing the impact of the nest on the coating quality in the edge area of the substrate.

The one or more supporting plates define a plane, and the angle between the bevel of each centering lug and said plane is preferably between 45° and 80°, more preferably between 55° and 75°, and particularly preferably between 60° and 70°. Instead of a bevel with a flat surface, however, a curved surface can also be provided, the surface being curved in any case such that, in a section through the centering lug perpendicular to the plane defined by the supporting plate and perpendicular to the inner wall of the opening, the edge of the centering lug comprises a curvature, which may be convex or concave but is preferably configured in a convex manner in view of the centering function. In the case of a curved surface, the above statements about the angles in relation to the plane of the supporting plate apply preferably to the mean tangent to the curved surface.

Preferably, the curvature of the curved surface comprises a radius of curvature of at least 3 mm, more preferably of at least 4 mm. Due to the narrow centering lug, the radius of curvature parallel to the inner wall is smaller and preferably at least 0.5 mm.

Preferably, the centering lugs project a first distance from the circumferential inner wall towards the opening, said distance being composed of a portion of the centering lug parallel to the supporting plate and a portion of the centering lug with a bevel or curvature. The inner wall comprises a height measured from the supporting edge, wherein the ratio between the first distance and the height is preferably between 0.6 and 1.6, more preferably between 0.7 and 1.3. The ratio is particularly preferably close to 1. The first distance is preferably between 2.4 mm and 4 mm, more preferably between 2.6 mm and 3.5 mm. The height is preferably between 2.5 mm and 4.0 mm, more preferably between 2.8 mm and 3.5 mm.

The width of the circumferential supporting surface is preferably at most 1.5 mm, more preferably at most 1 mm and particularly preferably at most 0.8 mm.

In the region of each centering lug, the circumferential supporting surface preferably comprises a recess. The recess preferably has a depth of 0.1 mm to 0.2 mm.

In the region of the supporting surface, the centering lug comprises a vertical section having a height of preferably 0.3 mm to 0.6 mm.

Preferably, the centering lugs comprise bottom radii, wherein the radius of the bottom radii is preferably larger than 0.5 mm.

The inner wall does not have to be designed exclusively vertical to the plane of the supporting plate. Further exemplary embodiments include a radius of curvature at the upper edge of the inner wall of at least 0.5 mm or a bevel or curvature of portions or the complete inner wall towards the supporting surface.

In the following, preferred embodiments of the present invention will be described in more detail with respect to the Figures, wherein FIG. 1 shows a perspective view of a substrate carrier according to a preferred embodiment of the present invention;

Figure 1:
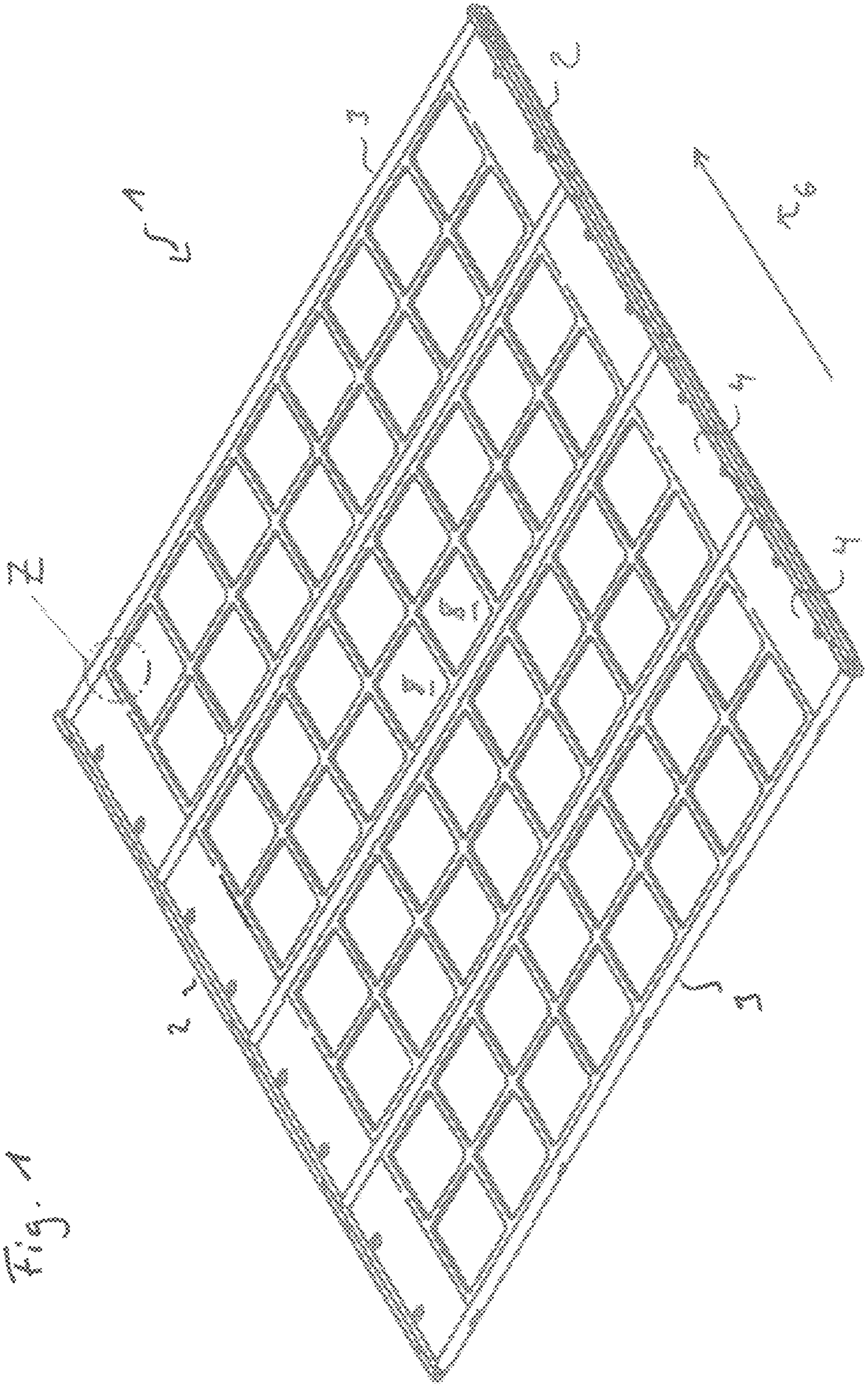
FIG. 1 shows a perspective view of a substrate carrier 1 according to a preferred embodiment of the present invention.

The substrate carrier 1 serves for receiving and transporting several substrates which may be received in corresponding receiving openings 8. In the illustrated exemplary embodiment, there are 64 of such receiving openings 8. As a matter of course, however, more or fewer receiving openings may be provided in a square, rectangular, or other arrangement. In the illustrated exemplary embodiment, the substrate carrier 1 comprises a frame with two opposing running rails 2 and two further opposing elongate frame members 3. Moreover, four supporting plates 4 mounted to the frame are provided. Needless to say, more or fewer supporting plates may be provided as well, and the supporting plates may also be mounted within the substrate carrier in another way.

The two running rails 2 serve for transportation of the substrate carrier 1 in a corresponding transportation device 6 and are designed and configured such that they can engage with corresponding members of the transportation device. However, the running rails are not required for the present invention. The supporting plates 4 may each be fixed permanently to the two running rails 2, e.g., by means of bolts or screws.

Figure 2:
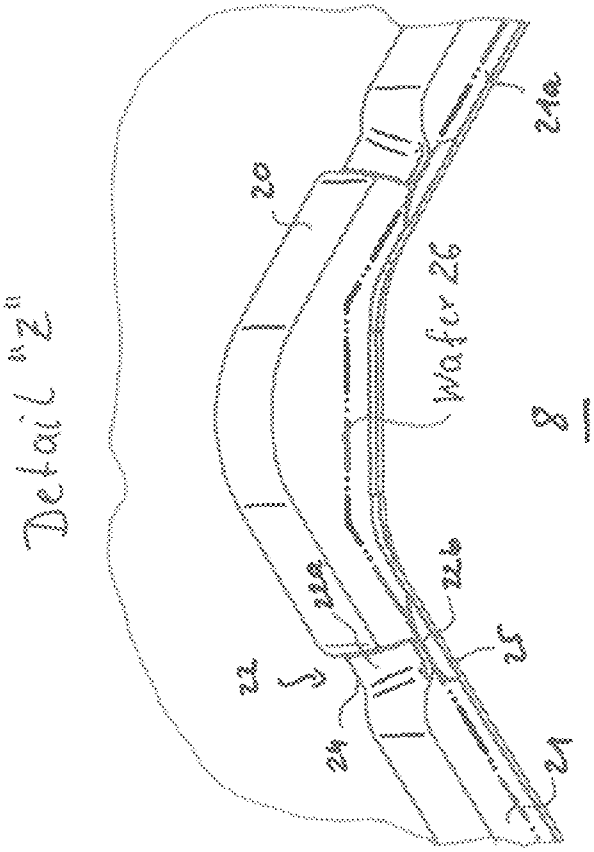
FIG. 2 shows a perspective detailed view of a "nest" for a substrate in a substrate carrier according to FIG. 1.
Figure 3:
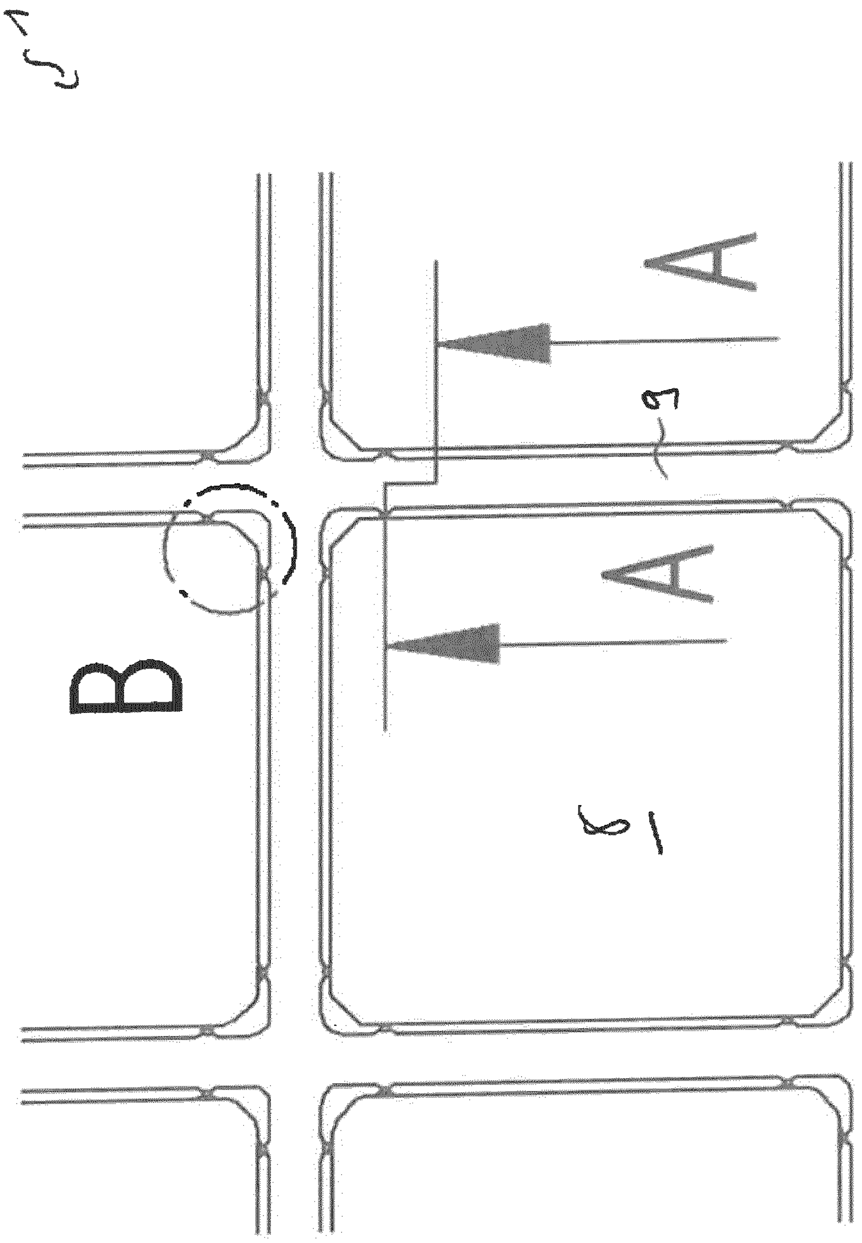
FIG. 3 shows a schematic top view of a portion of the substrate carrier according to FIG. 1.
Figure 4:
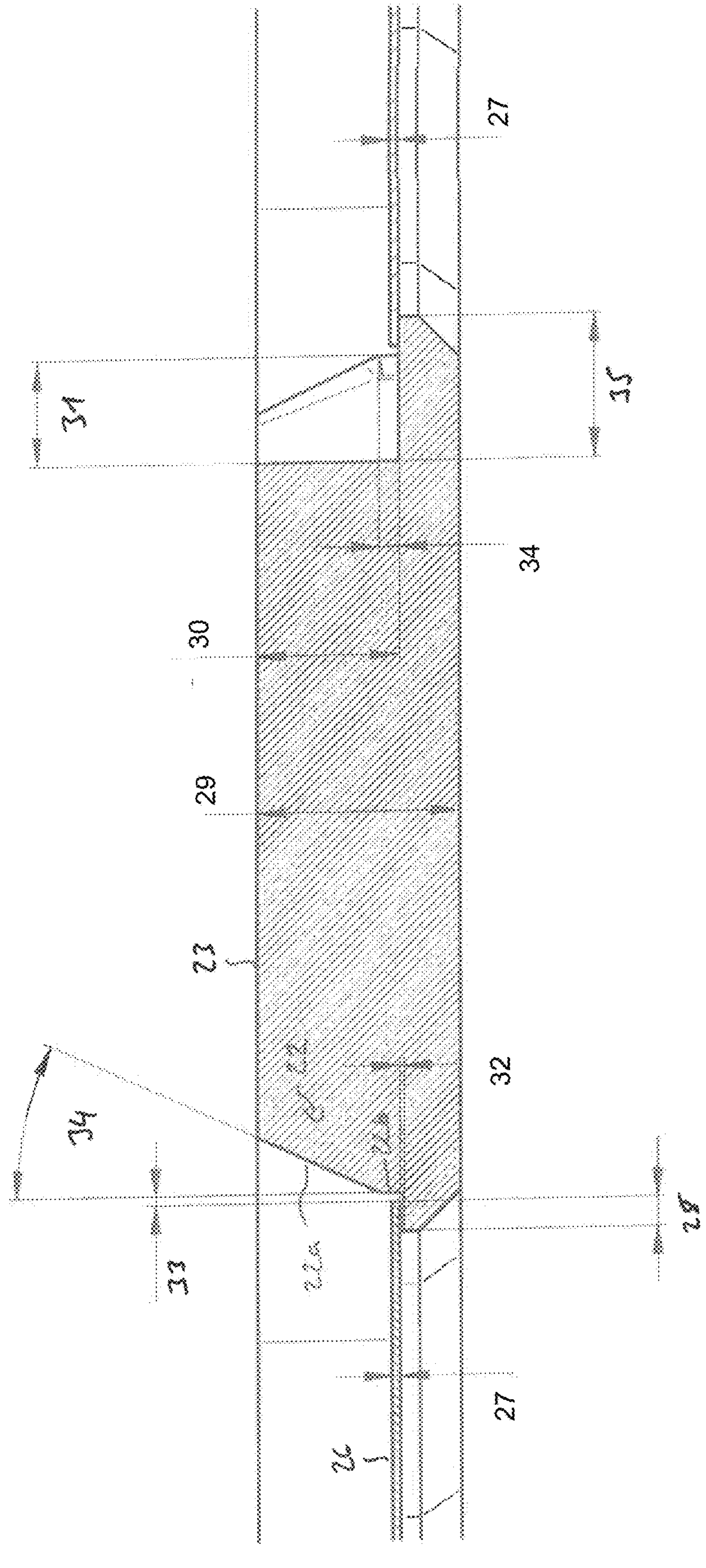
FIG. 4 shows a cross-sectional view along A-A in FIG. 3.

According to the invention, each receiving opening 8 for receiving one substrate each comprises a circumferential inner wall 20 and a circumferential supporting edge 21 of the width 35 (cf. FIG. 4), as can easily be taken from the detailed view according to FIG. 2. The circumferential supporting edge 21 forms a circumferential or circumferential supporting surface 21*a* for a substrate (indicated in FIG. 2 by the dashed line). Each opening 8 further comprises several centering lugs 22, each of which forming a bevel 22*a* which extends from the opening edge 24 defined by the inner wall 20 of the opening and a top surface 23 of the supporting plate to the supporting surface. In the region of each centering lug, the circumferential supporting surface 21*a* comprises a recess 25 interrupting the circumferential supporting surface 21*a* there. In the region of the supporting surface 21*a* (i.e., the recess 25 interrupting it), each centering lug preferably comprises a vertical section 22*b* having a height of preferably 0.3 mm to 0.6 mm.

With the help of the bevels 22*a* of the centering lugs 22, the respective substrate is selectively slid into the corresponding centered position without jamming. On the other hand, the vertical sections 22*b* of the centering lugs 22 provide stable support in the centered position when the substrate is resting on the supporting surface.

The width of the circumferential supporting surface 21*a* is preferably at most 1.5 mm, more preferably at most 1.2 mm and particularly preferably at most 1.0 mm in order to minimize edge coverage 28 (cf. FIG. 4) of the substrate 26. It goes without saying that the dimensions of the substrate should match the dimensions of the receiving openings 8 as precisely as possible, thus also minimizing the clearance 33 between the substrate and the centering.

The thickness 27 of the substrates is typically between 40 and 500 μm and is preferably at least smaller than the height 34 of the vertical section 22*b* of the centering lug 22, which is preferably smaller than 0.8 mm, more preferably smaller than 0.5 mm.

The angle 34 between the bevel 22*a* of the centering lug and the vertical is preferably between 10° and 45°.

Preferably, the centering lugs 22 protrude a first distance 31 from the circumferential inner wall 20 toward the opening, and the inner wall 20 has a height 30 measured from the supporting edge 21, wherein the ratio between the first distance 31 and the height 30 is preferably between 0.7 and 1.0.

The substrate carrier has a thickness 29 of preferably 2 and 10 mm.

Figure 5:
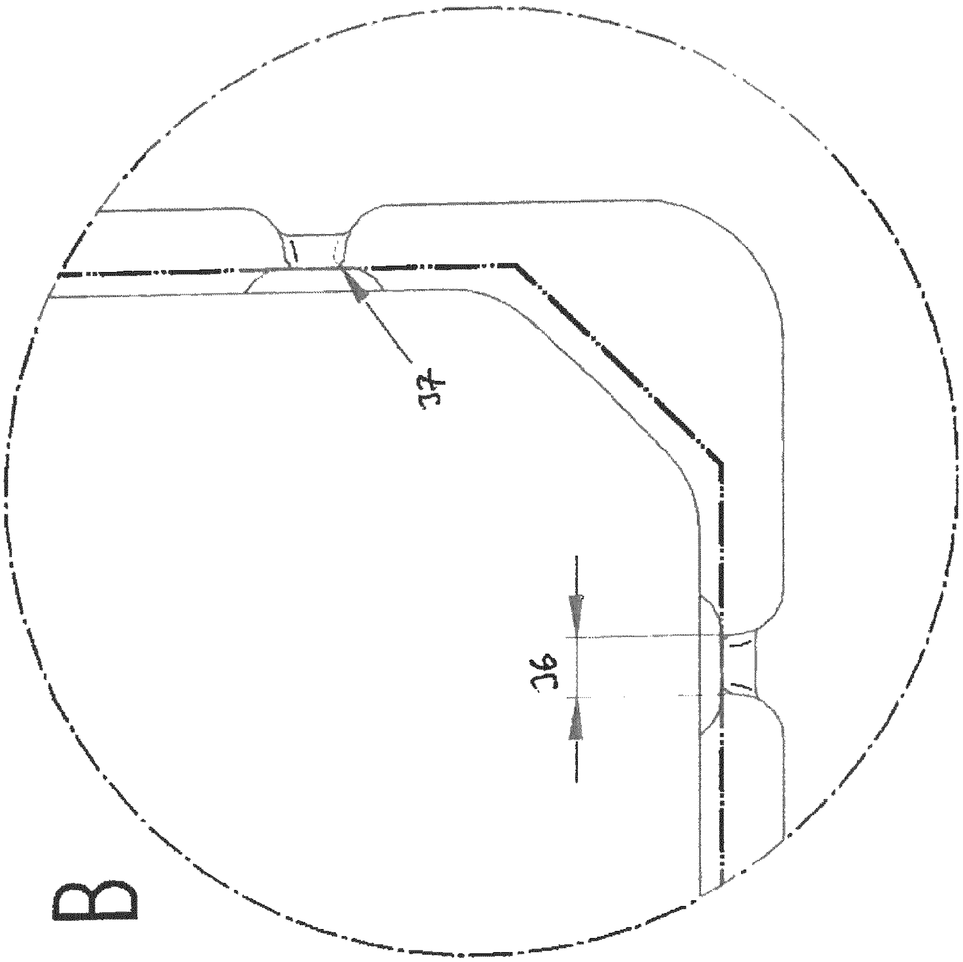
FIG. 5 shows a detailed view of the section marked B in FIG. 3.

It is further preferred that the centering lugs comprise bottom radii 37, as is indicated in the enlarged view according to FIG. 5. The width 36 of the centering lugs is preferably between 1 and 5 mm, particularly preferably approx. 2 mm.

The invention claimed is:

1. A substrate carrier for receiving and transporting several substrates, wherein the substrate carrier comprises one or more supporting plates, wherein each of the one or more supporting plates comprises several openings for receiving one substrate each, wherein each opening comprises a circumferential inner wall and a circumferential supporting edge forming a circumferential supporting surface for a substrate, wherein each opening further comprises several centering lugs, each of which forming a bevel or curved surface extending from an opening edge defined by the circumferential inner wall of the opening and a top surface of the supporting plate to the circumferential supporting surface, wherein the circumferential supporting surface comprises a recess in a region of each centering lug, and each of the several centering lugs comprises a vertical section directly connecting to a horizontal region of the circumferential supporting surface, wherein the vertical sections of the centering lugs provide stable support in a centered position when the substrate is resting on the circumferential supporting surface.

2. The substrate carrier according to claim 1, wherein the one or more supporting plates define a plane, and wherein the angle between the bevel of each centering lug and the plane is between 45° and 80°.

3. The substrate carrier according to claim 1, wherein the centering lugs protrude a first distance from the circumferential inner wall toward the opening, and wherein the circumferential inner wall has a height measured from the circumferential supporting edge, wherein the ratio between the first distance and the height is between 0.6 and 1.6.

4. The substrate carrier according to claim 3, wherein the first distance is between 2.4 mm and 4 mm.

5. The substrate carrier according to claim 3, wherein the height is between 2.5 mm and 4.0 mm.

6. The substrate carrier according to claim 1, wherein the width of the circumferential supporting surface is at most 1.5 mm.

7. The substrate carrier according to claim 1, wherein the recess has a depth of 0.1 to 0.2 mm.

8. The substrate carrier according to claim 1, wherein the centering lugs comprise bottom radii.

9. The substrate carrier according to claim 1, wherein the one or more supporting plates define a plane, and wherein the angle between the bevel of each centering lug and the plane is between 55° and 75°.

10. The substrate carrier according to claim 3, wherein the ratio between the first distance and the height is between 0.7 and 1.3.

11. The substrate carrier according to claim 3, wherein the first distance is between 2.6 mm and 3.5 mm.

12. The substrate carrier according to claim 3, wherein the height is between 2.8 mm and 3.5 mm.

13. The substrate carrier according to claim 1, wherein the width of the circumferential supporting surface is at most 1 mm.

14. The substrate carrier according to claim 1, wherein the vertical section has a height of 0.3 mm to 0.6 mm.

15. The substrate carrier according to claim 8, wherein a radius of the bottom radii is larger than 0.5 mm.

* * * * *